(12) United States Patent
Sieth et al.

(10) Patent No.: US 7,597,807 B2
(45) Date of Patent: Oct. 6, 2009

(54) RESIDENTIAL REVERSE OSMOSIS SYSTEM

(75) Inventors: Kenneth J. Sieth, Delafield, WI (US); Thomas J. Cartwright, Albertville, MN (US)

(73) Assignee: GE Osmonics, Inc., Minnetonka, MN (US)

( * ) Notice: Subject to any disclaimer, the term of this patent is extended or adjusted under 35 U.S.C. 154(b) by 495 days.

(21) Appl. No.: 11/182,508

(22) Filed: Jul. 15, 2005

(65) Prior Publication Data

US 2007/0012625 A1 Jan. 18, 2007

(51) Int. Cl.
*B01D 63/00* (2006.01)
*B01D 63/10* (2006.01)

(52) U.S. Cl. ............ 210/321.6; 210/257.2; 210/321.76; 210/321.85

(58) Field of Classification Search ............ 210/321.83, 210/257.2, 321.6, 321.76, 321.85, 321.86, 210/650, 652
See application file for complete search history.

(56) References Cited

U.S. PATENT DOCUMENTS

| | | | |
|---|---|---|---|
| 5,445,729 A | 8/1995 | Monroe et al. | |
| 5,509,462 A | 4/1996 | Demko et al. | |
| 5,520,816 A | 5/1996 | Kuepper | |
| 5,778,679 A | 7/1998 | Celorier, Jr. et al. | |
| 5,803,139 A | 9/1998 | Kennedy | |
| 5,891,333 A | 4/1999 | Ferguson | |
| 5,900,185 A | 5/1999 | Tapscott | |
| 6,099,735 A | 8/2000 | Kelada | |
| 6,103,125 A | 8/2000 | Kuepper | |
| 6,117,335 A | 9/2000 | Bender | |
| 6,190,558 B1 | 2/2001 | Robbins | |
| 6,200,466 B1 | 3/2001 | Bender | |
| 6,300,378 B1 | 10/2001 | Tapscott | |
| 6,397,788 B2 | 6/2002 | Besik | |
| 6,568,282 B1 | 5/2003 | Ganzi | |
| 6,589,426 B1 | 7/2003 | Husain et al. | |
| 6,761,826 B2 | 7/2004 | Bender | |
| 6,814,861 B2 | 11/2004 | Husain et al. | |
| 6,863,822 B2 | 3/2005 | Pipes | |
| 2002/0046969 A1 | 4/2002 | Bartsch et al. | |
| 2006/0138031 A1* | 6/2006 | Kloos et al. | ............ 210/96.2 |

FOREIGN PATENT DOCUMENTS

WO WO 2004/014528 * 2/2004

OTHER PUBLICATIONS

Soft Water Splash (Osmonics Labstore—vol. 5, Issue 1, Jul. 2005), pp. 1-7.*

* cited by examiner

*Primary Examiner*—Ernest G Therkorn
(74) *Attorney, Agent, or Firm*—Schwegman, Lundberg & Woessner, P.A.

(57) ABSTRACT

A reverse osmosis (RO) system which is capable of producing a permeate flow rate of at least about 25 GPD when the system is operating under a feed pressure of 30 psi.

5 Claims, 1 Drawing Sheet

RESIDENTIAL REVERSE OSMOSIS SYSTEM

FIELD OF THE INVENTION

This invention relates to the field of filtration devices, and more specifically to a system and apparatus for residential reverse osmosis (RO).

BACKGROUND

Consumers are becoming more concerned with the quality of their drinking water. When RO is used in a residential setting, water is pulled from the water line. This water is run through a sediment filter and then a carbon prefilter. The water then runs through a reverse osmosis membrane element. The concentrate stream from the membrane element flows to the drain, while the permeate water runs into a storage tank—usually with 1-2 gallon storage capacity. From the storage tank the permeate water runs through a second carbon filter (a polishing filter), then to a separate faucet usually mounted on the kitchen sink. In low pressure feed water situations, a pump is needed to increase the driving pressure across the membrane, increasing the complexity and cost of the system.

SUMMARY

A reverse osmosis (RO) system which is capable of producing a permeate flow rate of at least about 25 GPD when the system is operating under a feed pressure of 30 psi.

DETAILED DESCRIPTION

Figure 1:
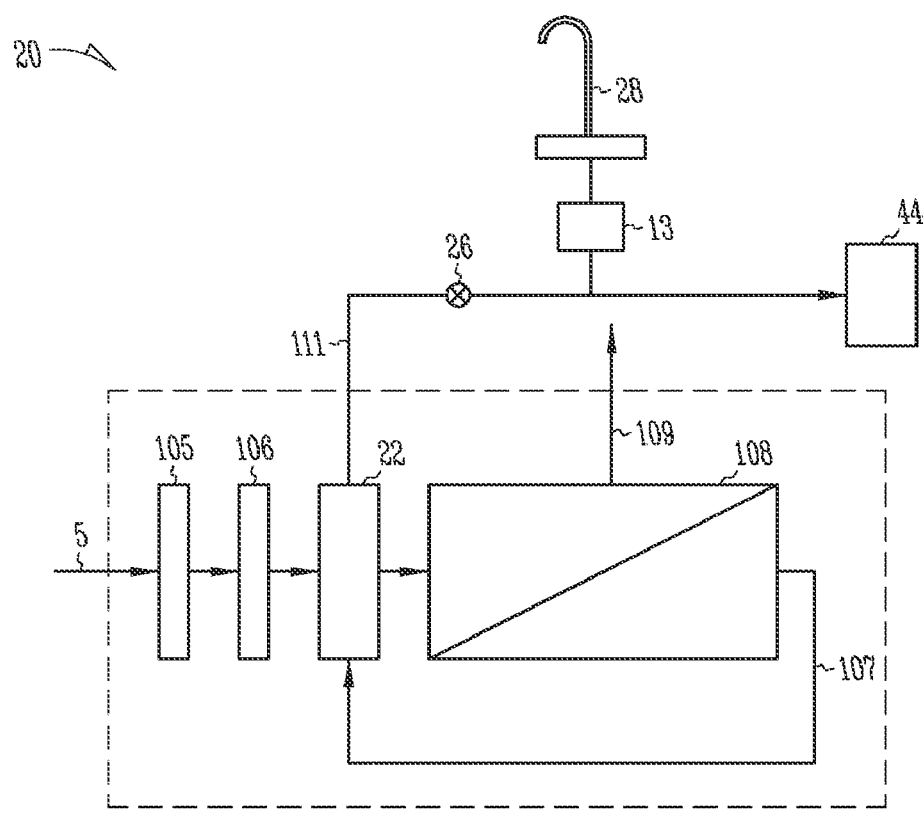
FIG. 1 shows a schematic representation of an RO filtration system according to one embodiment.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Definitions:

% Passage: The parts per million of chloride ion in the permeate divided by the parts per million of chloride ion in the feed, expressed as a percentage.

% Rejection: 100% minus % Passage

Net Driving Pressure: The feed water pressure minus the osmotic pressure difference between the feed water and the permeate water.

Membrane Element Flux: The amount of permeate that passes through a membrane element, expressed in gallons per day.

Membrane Element: A device that configures membrane in such a way that the feed and concentrate waters can be separated from the permeate water.

FIG. 1 shows a schematic representation of an RO system 20 according to one embodiment. In one embodiment, system 20 is a residential RO system capable of providing a sufficient flow rate of filtered water without requiring a pump in low pressure feed situations. For example, it is common in undeveloped parts of the world to have a feed water pressure of about 30 psi or less. As will be discussed, system 20 can deliver at least 25 GPD of permeate at feed water pressure of 30 psi without utilizing a pump to increase the input pressure of the feed water. This allows the system to be easily installed and used all over the world.

System 20 generally includes a RO housing assembly 21 and connected to a faucet 28. Housing assembly 21 has an inlet 5 to receive feedwater, which in a low pressure situation is typically at about 30 psi or less. The feedwater is directed through one or more sediment pre-filters 105, 106, then to a filtering membrane element 108. For example, sediment pre-filter 105 can be a 25 micron filter and pre-filter 106 can be a 5 micron filter. Some embodiments omit pre-filter 105. Element 108 includes a permeate outlet 107 and a concentrate outlet 109. The concentrate outlet 109 can include a flow restrictor, for example.

In one embodiment, the feed water line from sediment filter 106 and permeate outlet line 107 are coupled to an automatic shutoff (ASO) valve 22 which is activated by the pressure differential between the two lines. An output of the ASO valve 22 leads to faucet 28 and a storage tank 44 via a permeate outlet 111. Thus, when faucet 28 is opened and/or when tank 44 is low on filtered water, the resulting pressure drop in the permeate line opens ASO valve 22, to allow the input feed water to flow through the filtration elements 105, 106, and 108. A check valve 26 in the permeate line restricts back-flow when the faucet is turned off. A post-filter 113 is located before the faucet to filter the permeate coming from the tank 44 or the permeate line. When tank 44 is full, the back pressure in the permeate line closes the ASO valve 22 stopping the input water flow.

In use, a saddle valve can be used for tapping into a cold water line, for example. Then tubing is provided from the saddle valve to the inlet of housing assembly 21.

In various embodiments, pumpless system 20 minimizes one or more of the following problems with regular systems.

A typical RO system sold today uses carbon prefiltration to protect the membrane from damage by oxidants (such as chlorine and chloramines), found in many of the municipal water supplies. However, the pressure drop across the carbon filter is too high to allow a membrane element to operate correctly under low feed pressure situations. Thus, a pump is used to increase the driving pressure across the membrane. System 20 omits the carbon pre-filter. This allows the net driving pressure across the membrane element to be enough to produce a usable amount of water without requiring a pump. For example, the membrane element 108 can produce enough usable filtered water (at least about 25 GPD) without the need for a pump.

Moreover, a typical system which has a pump to increase the net driving pressure measures about 18"×15"×6" (1620 cubic inches). The combined system takes up a large amount of space within the kitchen sink cabinet. In contrast, the design of system 20 omits the pump and the carbon pre-filter, thus offering a more compact look and reducing the concern of the amount of space required underneath the sink or on a countertop. For example, housing assembly 21 can be about 374 cubic inches or less. Element 108 can be a rolled membrane element measuring about 1.8" in diameter and 10.0" long. The membrane element can be encapsulated in a module having a volume of about 52.3 cubic inches. In a system omitting pre-filter 105, the housing assembly 21 can have a volume of about 301 cubic inches or less. In other embodiments, a pumpless system can be designed so as to deliver at least 30 GPD at 30 psi at 55 F (12.7 C) and have a size of about 310 cubic inches or less; a pumpless system can be designed so as to deliver at least 30 GPD at 30 psi at 55 F and have a size of about 380 cubic inches or less; a pumpless system can be designed so as to deliver at least 30 GPD at 30 psi at 55 F and have a size of about 500 cubic inches or less; a pumpless system can be designed so as to deliver at least 30 GPD at 30 psi at 55 F and have a size of about 750 cubic inches or less.

In various embodiments, system 20 can be modified to include two or more elements 108 connected in parallel or series. Moreover, in some embodiments a plurality of systems 20 can be connected together. For example, a user can couple two or more of systems 20 into any series or parallel flow configuration.

In one embodiment, filter element 108 discussed above is a high flux RO membrane filter element. A high flux membrane element helps eliminate the need for any pump to pressure the feedwater through the system when the carbon pre-filter is removed since they can provide at least 25 GPD under a driving pressure of about 30 psi. Some RO membrane elements 108 have a spiral wound membrane element which includes a first membrane sheet and a second membrane sheet separated by a permeate carrier. Membrane element 108 can be a single-leaf or a multi-leaf design. In one embodiment, system 20 uses a model # TLC-150 RO Membrane by GE Osmonics.

In various examples, the element can be adapted to have various sizes, leaf numbers, and flow rates, and different numbers of elements can be provided in the system. At a feed pressure of 30 psi, one example provides a permeate flow rate of at least about 25 GPD. Other examples have flow rates of at least about 30 GPD, at least about 40 GPD, at least about 50 GPD, and between about 25 and about 50 GPD.

In some embodiments, electronic monitoring systems can be available on system 20. For example, electronics can be coupled to the ASO valve and detect each time the valve is opened or closed, thus allowing the system to know how long the system has been in actual use. This information can be used to predict when the sediment pre-filters 105 or 106 need to be changed. TDS (total dissolved solids) sensors can be coupled to the feed line and the permeate line for comparison. This information can be used to tell a user when to change the membrane elements. The electronics can also cause the indicator lights on the assembly or faucet to display as needed, as described above. For example, displaying when the filter and membrane element need to be changed. In some examples, each electronic system can consist of: 1) an electronic clock that displays every 6 or 12 months that filters need replacing and; 2) a TDS monitor that uses conductivity sensors to compare inlet TDS versus outlet (permeate) TDS and notifies the user when the % Rejection drops below a certain value (for example, 75% Rejection). Indicators, such as LEDs, LCDs, etc. can be mounted at the faucet and on the assembly and light up to show when elements need changing.

Example Membranes

Examples of RO membranes usable in a membrane element 108 of the present system can be prepared by the following methods.

Representative Membrane Elements

A spiral wound element is comprised of a leaf, or a combination of leaves, wound around a central tube with a feed spacer material. Each leaf is a combination of two membranes with a permeate carrier placed between the membranes. The region between the two membrane sheets is called the permeate channel. The leaf package is sealed to separate the permeate channel, with part of the permeate channel unsealed to allow for removal of the permeate fluid. For instance, in a spiral-wound membrane element, three sides of the leaf are typically sealed, while the fourth side of the leaf is typically connected to a permeate tube. The leaf length is defined as the longest straight-line distance of permeate flow to the permeate collection channel.

A high flux RO membrane prepared as discussed above provides a water permeability that is nearly three times as great as the permeability of brackish water RO membranes and provides about 75% greater permeability than "low pressure" RO membranes. The ultra high flux RO membrane has extremely high pure water permeability.

EXAMPLE

Membrane elements can be formed with various geometries depending on length, width, and performance characteristics desired. Embodiments of the present system allows for the use of optimized sized elements for use in a point-of-use system. Many different sizes and characteristics will be usable with the present system. Accordingly, the following example is given for illustration and are not limiting.

A system as shown in FIG. 1 was tested using a Model TLC-150 membrane element of GE Osmonics. Table 1 shows results of the test:

TABLE 1

| Time, hrs | Feed Temp. Celsius | GPD | Pressure, P1 | % Rejection |
|---|---|---|---|---|
| 0.0 | 12.7 | 38.04 | 34 | 93.66 |
| 213.67 | 16.7 | 27.39 | 28 | 91.35 |
| 391.25 | 16.4 | 26.63 | 31 | 90.57 |

As is seen from the example above, by utilizing a membrane as discussed herein, a pumpless RO system can be designed which is optimized for one or more design features, such as overall size and output. For example, by utilizing high-flux membranes and omitting a carbon prefilter, systems can be built having a permeate flow rate of at least 25 GPD when the system is operating under low pressure conditions.

Moreover, the present pump-free residential RO system can be more compact, have less service issues, cost less and provide better performance than existing products. The system can be mounted underneath a kitchen sink using a minimum amount of space. Moreover, the hardware associated with current low-pressure designs (i.e. the pumps and connecting the pumps to electrical connection) will not be needed thus decreasing costs and space requirements while increasing reliability. Although some embodiments describe a pumpless RO system, some embodiments could incorporate a pump if desired for a higher flow rate.

All publications, patents, and patent documents mentioned herein are incorporated by reference herein, as though individually incorporated by reference. It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A reverse osmosis system comprising:
   means for producing a permeate flow rate of at least about 25 GPD when the system is operating under a feed pressure of 30 psi and a temperature of about 12.7 Celsius without using a pump or carbon filter; and a housing assembly that contains the means for producing a permeate flow rate of at least about 25 GPD when the system is operating under a feed pressure of 30 psi and a temperature of about 12.7 Celsius, wherein the housing assembly is less than about 380 cubic inches.

2. The reverse osmosis system of claim 1, wherein the means for producing a permeate flow rate of at least about 25 GPD when the system is operating under a feed pressure of 30 psi and a temperature of about 12.7 Celsius includes a spiral wound membrane element.

3. The reverse osmosis system of claim 1, wherein the means for producing a permeate flow rate of at least about 25 GPD when the system is operating under a feed pressure of 30 psi and a temperature of about 12.7 Celsius includes means for rejecting at least 90% of chloride ions in a feed flow.

4. A reverse osmosis system comprising:
a housing assembly;
a sediment pre-filter within the housing assembly; and
a membrane element within the housing assembly such that the membrane element receives feed water from the sediment pre-filter, wherein the membrane element produces a permeate flow rate of at least 25 GPD under feed water pressure of 30 psi without using a pump or carbon filter, wherein the housing assembly is less than about 380 cubic inches.

5. The system of claim 4, wherein the membrane element is a spiral wound membrane element.

* * * * *

UNITED STATES PATENT AND TRADEMARK OFFICE
CERTIFICATE OF CORRECTION

PATENT NO. : 7,597,807 B2　　　　　　　　　　　　　　　　　　　　　　　　Page 1 of 1
APPLICATION NO. : 11/182508
DATED : October 6, 2009
INVENTOR(S) : Sieth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 809 days.

Signed and Sealed this

Twenty-eighth Day of September, 2010

David J. Kappos
*Director of the United States Patent and Trademark Office*